Jan. 13, 1931.　　　　J. BREZIN　　　　1,789,065
ICE CREAM DISHER
Filed Oct. 11, 1930
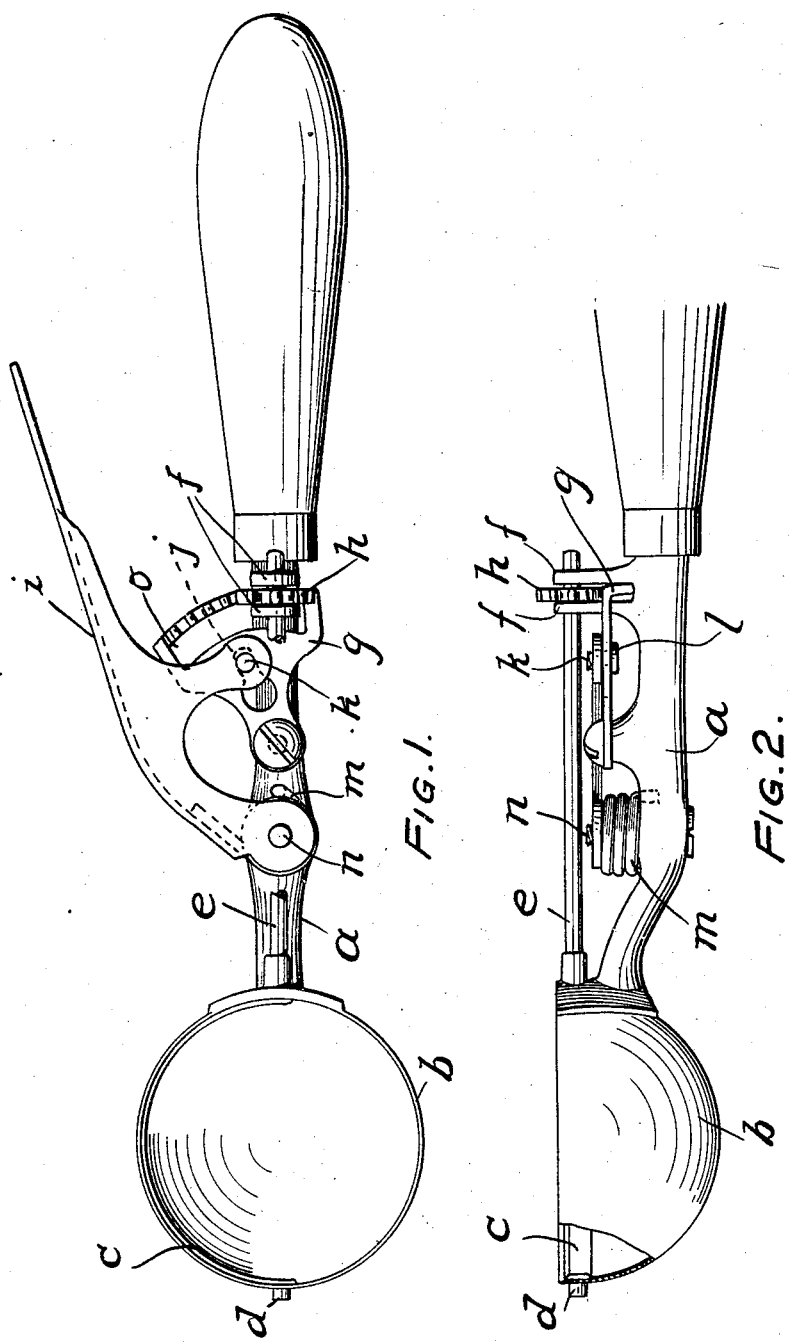
WITNESS:
INVENTOR
Joseph Brezin
BY
ATTORNEYS.

Patented Jan. 13, 1931

1,789,065

UNITED STATES PATENT OFFICE

JOSEPH BREZIN, OF PHILADELPHIA, PENNSYLVANIA, ASSIGNOR TO PHILADELPHIA ICE CREAM CONE MACHINERY COMPANY, OF PHILADELPHIA, PENNSYLVANIA, A CORPORATION OF PENNSYLVANIA

ICE-CREAM DISHER

Application filed October 11, 1930. Serial No. 487,965.

My invention relates to an improvement in dishers for ice cream such as are generally used for dishing a portion of ice cream from a supply thereof, as in the serving of ice cream as such or for its inclusion in soda waters, ice cream cones, and the like. More particularly the device in accordance with my invention is of the type provided with means for enabling ready ejection of the ice cream from the bowl or scoop by which it is removed from the supply.

Heretofore dishers for ice cream have been variously constructed and in general have been open to various objections, chiefly in that they are difficult to manipulate.

The device in accordance with my invention is simple in construction and may be efficiently operated with a minimum of effort. At the same time, its various parts may be readily disassembled and assembled for thorough cleaning and the parts are so arranged as to insure continuity of efficient operation and to enable the parts to be normally maintained desirably clean.

Having indicated in a general way the nature and purpose of my invention, I will proceed to a detailed description thereof with reference to the accompanying drawings in which a preferred embodiment has been illustrated and in which:

Figure 1 is a plan view of a device embodying my invention.

Figure 2 is a side view of the device shown in Figure 1, partly in section, and with the handle partly broken away.

In the drawings $a$ indicates a handle to one end of which is secured a scoop or bowl $b$ of desired size to accommodate a desired portion of ice cream. $c$ indicates a scraper or ejector of the usual type positioned within the scoop. One end of the scraper is pivotally connected to the scoop by means of a trunnion $d$, while the other end is connected to the end of a shaft $e$, which bears in the handle and scoop at a point opposite the bearing in the scoop of the trunnion $d$. The shaft $e$ extends longitudinally of the handle and its end opposite to that connected with the scraper is mounted in bearings $f, f$.

Pivotally mounted on the handle beneath the shaft $e$ is a rack member $g$, the rack engaging with a pinion $h$ carried by the shaft and desirably positioned between the bearings $f, f$. Pivoted to the handle is a finger piece $i$, which is connected to the rack member $g$ through the medium of a slot and pin connection. Desirably the rack member is provided with a slot $j$ enlarged at one end for the reception of pin $k$ carried by the finger piece and provided with a head $l$.

A coil spring $m$ is positioned about the pivot $n$ connecting the finger piece with the handle, one end of the spring being connected to the handle and the other end being connected to the finger piece in such manner that the finger piece will be operated from normal position against the tension of the spring and returned by operation of the spring. The operation of the disher in accordance with my invention will, it is believed, be clear, it being noted that on operation of the finger piece the rack is rotated on its pivot, in turn rotating the pinion $h$ and shaft $e$, causing the scraper to sweep through the scoop or bowl, freeing ice cream contained therein and enabling the ice cream to be dropped out.

It will be noted that by virtue of the slot and pin connection between the finger piece and the rack member the difference in angularity of the movement of the finger piece and rack member is compensated for by sliding of the pin in the slot. Hence, manipulation of the rack by the finger piece is not only efficient, but is accomplished with substantially no effort other than that necessary to overcome the tension of spring $m$, since the connection between the finger piece and rack member cannot bind. It will be noted that the movement of the rack member in either direction is stopped due to the extension of one of the bearing members $f$ through a slot $o$ formed in the rack member.

It will be understood that while the essential feature of my invention resides in the provision of a slot and pin connection between the finger piece and rack member, I contemplate as within the scope of my invention the structure described as a whole, which, however, it will, of course, be appreciated may be variously modified without departing from my invention.

What I claim and desire to protect by Letters Patent is:

1. An ice cream disher including, in combination, a handle, a scoop secured to the handle, a shaft mounted on the handle, a scraper secured to the shaft and positioned within the scoop, a finger piece pivotally mounted on the handle, a rack pivotally mounted on the handle, a pinion on the shaft engaging the rack and means forming a sliding connection between the finger piece and the rack.

2. An ice cream disher including, in combination, a handle, a scoop secured to the handle, a shaft mounted on the handle, a scraper secured to the shaft and positioned within the scoop, a finger piece pivotally mounted on the handle, a spring engaged with the handle and with the finger piece, a rack pivotally mounted on the handle, a pinion on the shaft engaging the rack and means forming a sliding connection between the finger piece and the rack.

3. An ice cream disher including, in combination, a handle, a scoop secured to the handle, a shaft mounted on the handle, a scraper secured to the shaft and positioned within the scoop, a finger piece pivotally mounted on the handle, a rack pivotally mounted on the handle, a pinion on the shaft engaging the rack and a slot and pin connection between the finger piece and the rack.

4. An ice cream disher including, in combination, a handle, a scoop secured to the handle, a shaft mounted on the handle, a scraper secured to the shaft and positioned within the scoop, a finger piece pivotally mounted on the handle, a rack pivotally mounted on the handle, a pinion on the shaft engaging the rack, a slot enlarged at one end formed in the rack and a pin having an enlarged end carried by the finger piece and adapted to engage in said slot.

In testimony of which invention, I have hereunto set my hand, at Philadelphia, Penna., on this 8th day of October, 1930.

JOSEPH BREZIN.